April 23, 1963  H. J. SHAFER, JR  3,086,458
DECORATING METHOD AND APPARATUS
Filed Dec. 12, 1958  2 Sheets-Sheet 2

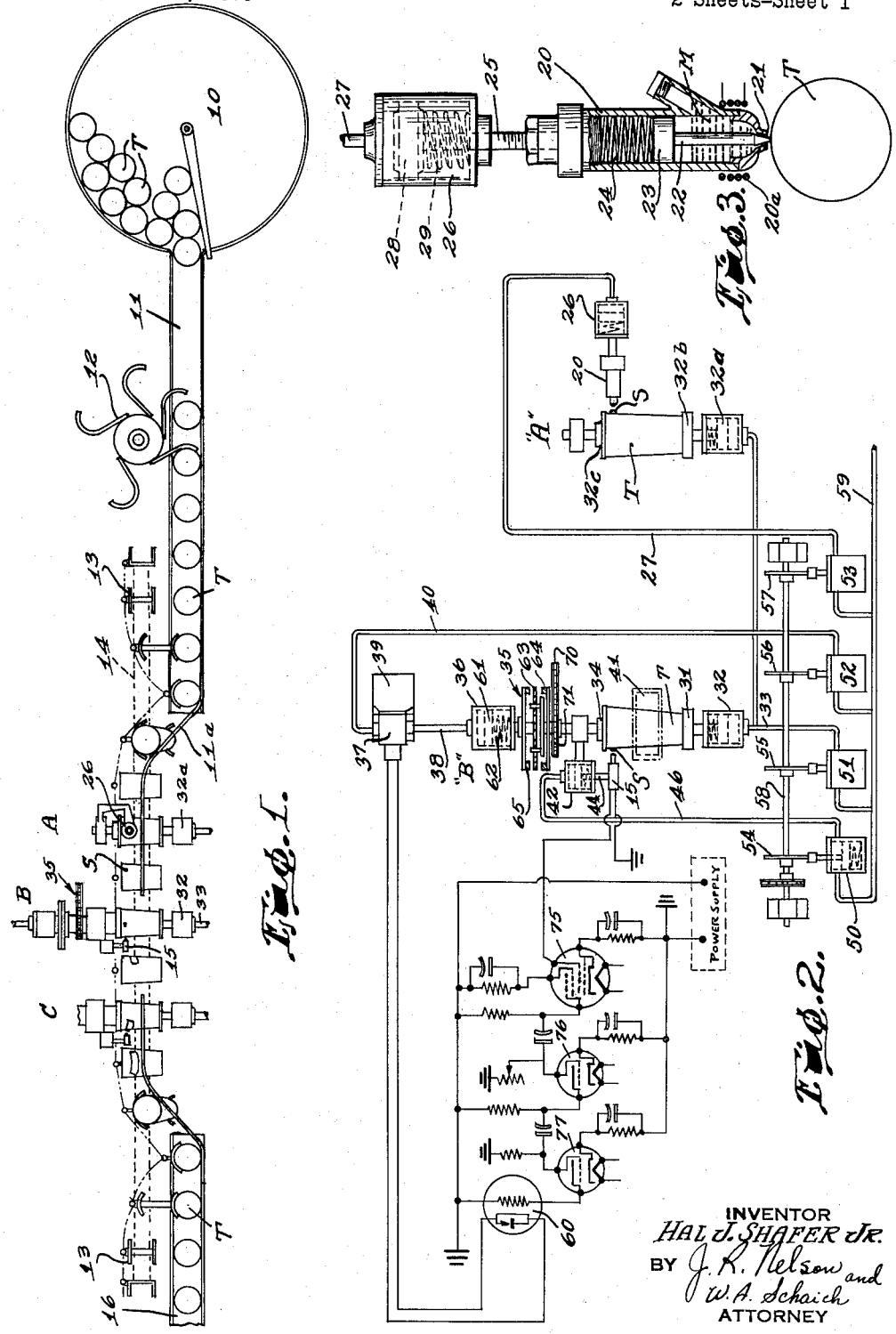

INVENTOR
HAL J. SHAFER JR.
BY J. R. Nelson
and W. A. Schaich
ATTORNEY

United States Patent Office 3,086,458
Patented Apr. 23, 1963

3,086,458
DECORATING METHOD AND APPARATUS
Hal J. Shafer, Jr., Toledo, Ohio, assignor to Owens-Illinois Glass Company, a corporation of Ohio
Filed Dec. 12, 1958, Ser. No. 779,995
12 Claims. (Cl. 101—115)

This invention relates to the decorating of articles made of glass or other nonmagnetic material and particularly to the registering of such articles in proper position for the application of successive decorations.

In the decorating of articles such as tumblers or containers wherein it is desired to apply a plurality of different colors it is necessary to bring each article into register with the decorating apparatus prior to the application of each color in order that the resultant design will show the proper arrangement of the colors.

It has heretofore been suggested that protuberances or depressions be provided in the surface of the article and that these protuberances or depressions be detected by scanning the surface of the article with a feeler or finger. Although such a registering method is quite successful, it necessitates the formation of these projections or detents in the wall of the article. This not only requires an added expenditure in the cost of making the mold for the article but in addition, results in an area of possible damage to the article.

It is therefore an object of this invention to provide a novel method and apparatus for registering the articles in position for application of decorating material.

It is a further object of the invention to provide such a method and apparatus which does not rely on the formation of a protuberance or detent in the container.

In the drawings:

FIG. 1 is a diagrammatic view illustrating one arrangement of an apparatus for decorating articles.

FIG. 2 is a diagrammatic wiring and pneumatic diagram of the apparatus.

FIG. 3 is a part sectional elevation of a portion of the apparatus for applying a spot of magnetic material to the article.

Figure 4:
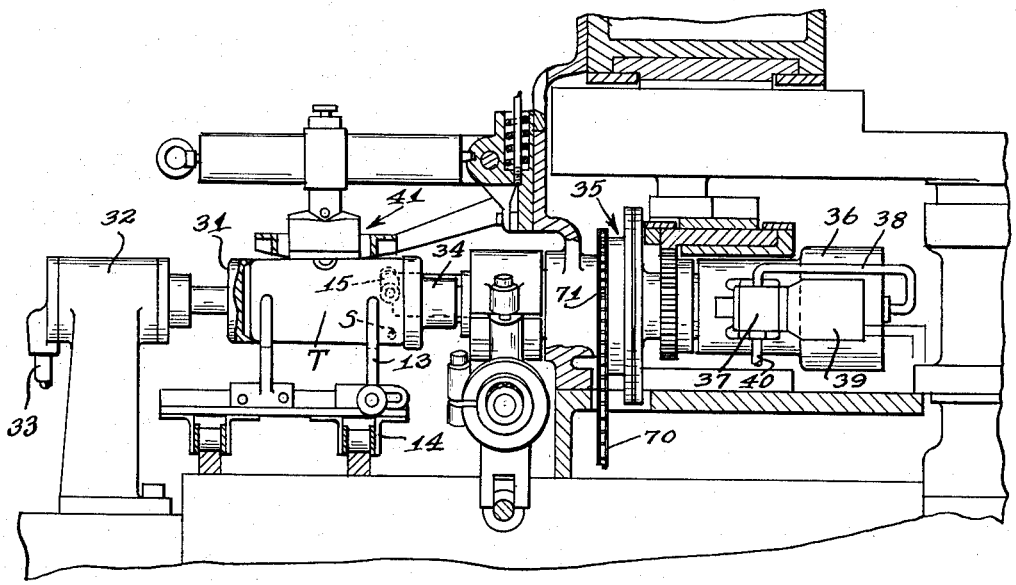
FIG. 4 is a part sectional side elevation of the apparatus at the decorating station.

Basically, according to the invention, a spot of magnetic material is applied to a surface of an article, the article is thereafter rotated about its longitudinal axis and an electromagnetic head is brought into position adjacent the surface of the article to thereby scan the surface. When the spot of electromagnetic material enters the field of the electromagnetic head it creates an electrical signal which is then amplified and the amplified signal actuates a mechanism for stopping the rotation of the article thereby registering it in position for application of the decorating material. When the article is moved to a successive decorating station, it is again rotated and an electromagnetic head is again brought into position to scan the article and thereby stop its rotation in the proper position for the application of decorating material in the same manner as at the first station.

Refering to FIG. 1 which shows the apparatus diagrammatically, the articles T of nonmagnetic material, herein shown as comprising glass tumblers, are fed from a rotating table 10 to a conveyor 11. As the articles T are moved along by the conveyor, they are spaced longitudinally on the conveyor by a rotating spacer mechanism 12 having radial spacer arms. As the articles T near the end of the conveyor 11 they are transferred to cradles 13 on an endless conveyor 14 by engagement with a guide bar 11a. The cradles 13 thereafter are swung about an axis parallel to the longitudinal axis of the conveyor 14 to bring the tumblers into generally horizontal position with their longitudinal axes at right angles to the path of movement of the conveyor. Conveyor 14 is moved in step by step fashion to carry the tumblers successively to stations A, B and C. At station A each tumbler T is held in position and a spot S of thermoplastic material containing magnetic material is applied to the surface of the tumbler T. At station B each tumbler T is gripped, rotated about its longitudinal axis and scanned by an electromagnetic head 15 to bring it into register with a decorating mechanism as presently described. When the tumbler is in proper register, decorating material is applied to its surface at station B. Each tumbler T is then moved by the conveyor 14 to station C where it is again gripped and rotated and its surface is again scanned by an electromagnetic head 15 to bring it into proper register for an additional decorating operation. Finally each cradle 13 is swung to bring each tumbler to a generally vertical position and thereby transfer it to a conveyor 16 which carries the tumblers to an oven (not shown) where the decorating material is dried.

The scanning head 15 at each of the stations B, C, comprises an electromagnet so that when the spot S of magnetic material enters the field of the electromagnet the magnetic field is increased causing an electrical signal. The electrical signal is amplified by an amplifier and is caused to actuate a mechanism for stopping the rotation of the tumbler T at the decorating station A.

The conveyor 13 and the decorating mechanisms at stations B and C are of conventional construction and may be of the types shown in the prior patents to Jackson et al. 2,231,535, Jackson 2,261,255 and Jackson et al. 2,365,961.

As shown in FIG. 3, the apparatus at station A for applying a spot of magnetic material comprises a generally cylindrical housing 20 having an opening 21 in the lower end thereof adjacent the surface of the tumbler T. Housing 20 contains a thermoplastic material M having magnetic material such as iron filings mixed therewith. A heating coil 20a is positioned around housing 20 to maintain the thermoplastic material at the proper viscosity. A plunger 22 extends downwardly into opening 21 and a piston 23 is formed on the upper end of plunger 22. A spring 24 normally urges the plunger 22 downwardly closing the opening 21. The housing 20 is mounted on shaft 25 of a piston motor 26. Air under pressure is periodically supplied to piston motor 26 through a line 27, the air acts on piston 28 which is normally urged upwardly by a spring 29. When air is supplied to the piston motor 26, the housing 20 is moved downwardly bringing the plunger 22 into engagement with the surface of the tumbler T. Continued movement of the housing 20 downwardly causes the plunger 22 to be displaced upwardly relative to the housing thereby permitting a drop of thermoplastic material to pass downwardly through opening 21 and around the lower end of plunger 22 onto the tumbler T. When the supply of air to piston motor 26 is interrupted, spring 29 causes the housing 20 to be returned to its upward position and the plunger 22 closes the opening 21 in the lower end of the housing. The supply of air to piston motor 26 is controlled periodically as presently described.

As shown in FIG. 4 the apparatus at the stations B and C comprises a rotatable axially movable chuck 31 for engaging one end of the tumbler T and moving it against a rotatable chuck 34. Chuck 31 is moved into and out of engagement with the end of the tumbler by an air piston motor 32 to which air is supplied by a line 33. The rotation of the chuck 34 is controlled by a combined clutch and brake 35. Operation of clutch and brake assembly 35 is controlled by an air piston motor 36 to which air is supplied from a solenoid valve 37 through a line 38. Solenoid 39 of solenoid valve 37 is energized by a signal from the amplifier as presently described. Air is supplied to the valve 37 through a line 40. The drive for rotating chuck 34 is provided through a chain 70 driving a sprocket 71 continuously. The decorating mechanism as used in association with stations B and C is of conventional construction and is generally designated 41 in FIG. 4.

Figure 5:
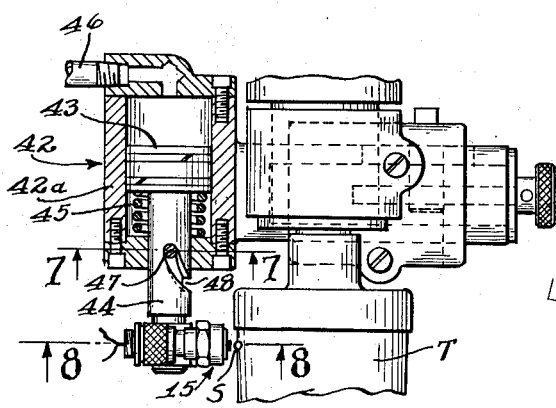
FIG. 5 is a part sectional plan view of a portion of the apparatus shown in FIG. 4.
Figure 6:
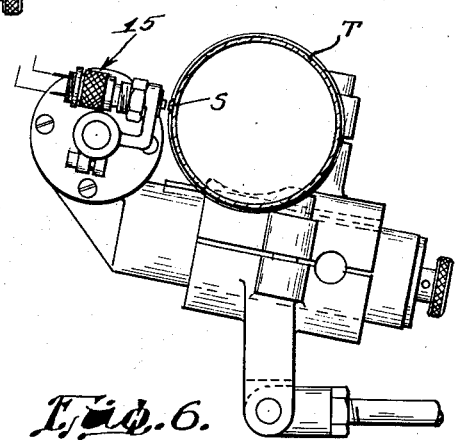
FIG. 6 is an end elevation of the apparatus shown in FIG. 5.
Figure 7:
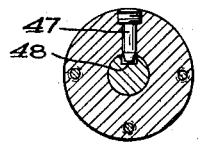
FIG. 7 is a sectional view taken along the line 7—7 in FIG. 5.

The mechanism for moving the magnetic head 15 into position adjacent the surface of the tumbler T is shown in FIGS. 5–7 and comprises an air piston motor 42 having a piston 43 therein on the shaft 44 of which the magnetic head 15 is mounted. The shaft 44 is normally urged outwardly relative to a tumbler T by a spring 45 compressed between one end of piston motor cylinder 42a and the piston 43. Air is supplied to the piston motor 42 through a line 46. A pin 47 fixed in the cylinder 42a engages a groove 48 in shaft 44 and causes the head 15 to rotate inwardly toward the tumbler T when air is supplied to the end of piston 43 thereby bringing the electromagnet in head 15 into position adjacent the surface of tumbler T.

The operation of the pistons 32, the piston motor 26, the piston motor 36 and piston motor 42 is controlled by a series of air valves 50, 51, 52 and 53 actuated by cams 54, 55, 56 and 57, respectively, which are fixed on a shaft 58 and continuously rotated in timed relationship to the movement of the conveyor 14. Each of the valves 50, 51, 52 and 53 is of the type which is operable to permit the flow of air under pressure from a supply line 59 through the valve to the piston motor which is controlled by the valve.

As shown in FIG. 2, when the valve 51 is opened by cam 55, air is supplied under pressure to the piston motor 32a at station A and piston motor 32 at station B to cause the chucks 32b, 31 to engage the end of a tumbler T and thereby cause a tumbler to be gripped between chucks 32c and 32b at station A and 31 and 34 at station B.

When the valve 53 is opened by cam 57, air is supplied through the line 27 to piston motor 26 causing the spot applicator to apply a spot of thermoplastic material containing magnetic material on the surface of the tumbler T which is gripped by the chucks 32c and 32b.

While the spot is being applied to a tumbler at station A, the valve 50 is opened by cam 54 causing air to flow to the piston motor 42 at station B through line 46 thereby positioning the magnetic head 15 adjacent the surface of the tumbler T. At the same time that the chuck 31 is engaged with the end of a tumbler, the tumbler is rotated by drive through sprocket 71.

When the spot S of the thermoplastic material containing magnetic material enters the magnetic field of the head 15, the magnetic field is increased producing an electrical signal which passes to the amplifier represented by the area enclosed in dotted lines in FIG. 2. The signal is amplified by the amplifier and caused to energize a relay 60 which in turn energizes the solenoid 39. Energization of the solenoid 39 closes the valve 37 actuating clutch and brake assembly 35 to stop the rotation of chuck 34. Specifically, the elimination of air pressure on piston 61 of piston motor 36 permits the piston 61 to move upwardly under the action of spring 62 in piston motor 36 carrying clutch plate 63 upwardly as shown in FIG. 2 away from drive plate 64, which is rotated by the chain 70 and sprocket 71, into position against brake disc 65 thereby stopping the rotation of tumbler T. The tumbler is thus in register with the decorating mechanism 41.

Station C is not shown in FIG. 2 but it should be understood that a similar arrangement for operating the head 15 and rotating the tumbler is provided at station C, so that a tumbler is registered and decorated at station C while a tumbler is registered and decorated at station B and a spot is being applied to a tumbler at station A.

The amplifier which is used to amplify the electrical signal created by the magnetic head 15 may be of any conventional well-known construction and as shown in FIG. 2 comprises a pentode 75 to the control grid of which the signal is first applied and the output of which is provided to the grids of amplifier tubes 76 and 77 to amplify the signal and operate the relay 60.

Figure 8:
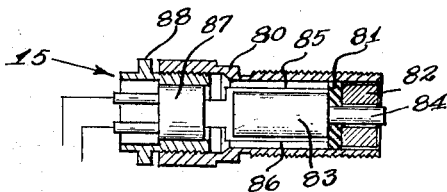
FIG. 8 is a sectional view taken along the line 8—8 in FIG. 5.

The electromagnet head 15 may be of any conventional construction adapted to provide an electrical signal when magnetic material is brought into position adjacent the head. As shown in FIG. 8, the electromagnet head 15 comprises an open ended cylindrical housing 80 in which a plug 81 of insulating material is press fitted intermediate the ends thereof. Plug 81 supports a coil 82 adjacent one end of housing 80 and an electromagnet 83 including an axial projection 84 extending through the coil 82. The leads 85, 86 from the coil 82 extend through a block 87 of insulating material mounted in a cap 88 threaded in the other end of the housing 80. Electromagnetic head 15 is mounted in such a position as to bring the open end including the coil 82 and the projection 84 of the magnet 83 into position adjacent the surface which is to be scanned.

In practice, a spot of magnetic material will be applied to an article at station A while articles at stations B and C are being scanned, registered and decorated.

The material which is used to apply the spot at station A may be of any suitable type which will carry magnetic material but is preferably thermoplastic in nature so that when the articles are fired in an oven to dry the decorating materials, the thermoplastic material will be decomposed and there will be no permanent spot left on the articles. Suitable thermoplastic materials comprise, for example, polyethylene which decomposes at approximately 284° F. and bleached bees wax which decomposes at approximately 170° F. Other thermoplastic materials may also be used.

I claim:

1. In the decorating of articles of nonmagnetic material, the method of orienting the articles to bring a predetermined surface area of the article into position for decoration which comprises the steps of applying a spot of magnetic material to the surface of the article, bringing an electromagnet into position adjacent to and spaced from the surface of the article, rotating the article relative to the magnet to scan the surface of the article and cause the spot of magnetic material to increase the magnetic field of the electromagnet as it enters said field thereby producing an electrical impulse, amplifying the impulse, and causing the amplified impulse to stop the rotation of the article in a predetermined position.

2. In the decoration of articles of nonmagnetic material, the method which comprises the steps of applying a spot of magnetic material to a surface of the article, bringing an electromagnet into position adjacent to and spaced from the surface of the article, causing rotation of the article about its longitudinal axis relative to the electromagnet thereby scanning the surface of the article and causing the magnetic material to increase the strength of the magnetic field of the electromagnet when it enters the field and thereby produce an electrical signal, and interrupting the rotation of the article in response to said signal.

3. In the decorating of articles of nonmagnetic material, the method which comprises moving the articles in succession to a series of successive stations, applying a spot of magnetic material to a surface area of an article at a first station, rotating the article about its longitudinal axis at a second station, and bringing an electromagnet into position adjacent to and spaced from the surface of said article while it is being rotated at said second station to scan the surface of said article and cause the magnetic field of said electromagnet to be increased when the spot of magnetic material enters the field thereby creating an electrical signal, amplifying the signal and stopping the rotation of said article in response to said amplified signal.

4. In the decorating of articles of nonmagnetic material, the method which comprises moving the articles in succession past a series of successive stations, applying a spot of magnetic material to the surface of each article at a first station, rotating each article about its longitudinal axis at a second station, bringing an electromagnet into position adjacent to and spaced from the surface of each article while the article is rotating at said second station to scan the surface and cause the magnetic material to increase the magnetic field of the electromagnet as it enters the field thereby producing an electrical signal, amplifying said signal, and stopping the rotation of said article in response to said amplified signal.

5. In the decorating of an article of nonmagnetic material, the combination comprising means for applying a spot of magnetic material to a surface of an article, electromagnetic means adjacent to and spaced from the surface of the article, means for rotating the article relative to said latter means to scan the surface and cause an electrical signal when the magnetic material enters the field of the electromagnetic means by increasing the magnetic field of the electromagnet, means for amplifying the signal, and means responsive to said signal for stopping said rotating means to interrupt the rotation of said article in a predetermined position.

6. In the decorating of an article of nonmagnetic material, the combination which comprises means for applying a spot of magnetic material to a surface of the article, means for rotating the article about its axis, an electromagnetic head, means for moving said head into position adjacent to and spaced from the surface of the article while the article is rotating to scan the surface of the article and cause the magnetic material to create an electrical signal when it enters the field of said electromagnetic head by increasing the magnetic field of the electromagnet, means for amplifying said electrical signal, and means responsive to said amplified signal for stopping the rotation of said article in a predetermined position.

7. In the decorating of an article of nonmagnetic material, the combination comprising means for moving said article in succession to a series of stations along a predetermined path, means at one said station for engaging the article and applying a spot of magnetic material thereto, means at a successive station for rotating said article about its longitudinal axis, an electromagnetic head at said latter station, means for moving said electromagnetic head into position adjacent to and spaced from the surface of the article while the article is rotating to scan the surface of the article and create an electrical signal when the spot of magnetic material enters the field of the electromagnetic head by increasing the magnetic field of the electromagnet, means for amplifying said signal, and means responsive to the amplified signal for stopping the rotation of said article in a predetermined position.

8. In the decorating of articles made of a nonmagnetic material, the method which comprises applying a spot of thermoplastic material containing magnetic material to a surface portion of said article, bringing an electromagnetic head into position adjacent the surface of the article, rotating the article relative to said head thereby scanning the surface of the article and creating an electrical signal when the spot containing the magnetic material is brought into the field of the magnet, interrupting the rotation of the article in a predetermined position in response to the signal, thereafter applying decorating material to said article and firing said article to set the decorating material and remove the thermoplastic spot.

9. In the decorating of an article of nonmagnetic material having a spot of magnetic material on a surface portion thereof, the combination comprising means for rotating said article about its longitudinal axis, an electromagnetic head, means for moving said electromagnetic head into position adjacent to and spaced from the surface of the article while the article is rotating to scan the surface of the article and create an electrical signal by increasing the magnetic field of the electromagnet when the spot of electromagnetic material enters the field of the electromagnetic head, means for amplifying said signal, and means responsive to the amplified signal for stopping the rotation of said article in a predetermined position.

10. In the decorating of articles of nonmagnetic material, the method which comprises the steps of applying a predetermined amount of a composition comprising a liquid carrier and granular magnetic material to form a spot of magnetic material on a surface of the article, bringing an electromagnet into position adjacent to and spaced from the surface of the article, causing rotation of the article about its longitudinal axis relative to the electromagnet thereby scanning the surface of the article and causing the magnetic material to increase the strength of the magnetic field of the electromagnet when it enters the field and thereby produce an electrical signal, and interrupting the rotation of the article in response to said signal.

11. In the decorating of articles made of a nonmagnetic material, the method which comprises applying a spot of material decomposable by heat and containing magnetic material to a surface portion of said article, bringing an electromagnetic head into position adjacent the surface of the article, rotating the article relative to said head thereby scanning the surface of the article and creating an electrical signal when the spot containing the magnetic material is brought into the field of the magnet, interrupting the rotation of the article in a predetermined position in response to the signal, thereafter applying decorating material to said article and firing said articel to set the decorating material and remove the spot.

12. In the decorating of articles of nonmagnetic materials, the method of orienting the articles to bring a predetermined surface area of the articles into position for decoration which comprises the steps of applying a spot of magnetic material to the surface of the article, creating an electromagnetic field adjacent to and spaced from the surface of the article, rotating the article relative to the magnetic field to scan the surface of the article to cause the spot of magnetic material to change the magnetic field and thereby produce an electrical impulse, amplifying the impulse, and causing the amplified impulse to stop the rotation of the article in a predetermined position.

References Cited in the file of this patent

UNITED STATES PATENTS

| | | |
|---|---|---|
| 1,824,432 | Hendry | Sept. 22, 1931 |
| 2,109,505 | Rue et al. | Mar. 1, 1938 |
| 2,150,522 | Shurley et al. | Mar. 14, 1939 |
| 2,200,103 | Shutt | May 7, 1940 |
| 2,229,347 | Shurley | Jan. 21, 1941 |
| 2,508,953 | Knutsen | May 23, 1950 |
| 2,537,770 | Livingston et al. | Jan. 9, 1951 |

(Other references on following page)

UNITED STATES PATENTS

| | | |
|---|---|---|
| 2,557,022 | Wobowitz | June 12, 1951 |
| 2,558,761 | Kentis | July 3, 1951 |
| 2,587,664 | Stout | Mar. 4, 1952 |
| 2,734,619 | Labombarde | Feb. 14, 1956 |
| 2,736,101 | Blume | Feb. 28, 1956 |
| 2,747,152 | Greene | May 22, 1956 |
| 2,751,433 | Linger | June 19, 1956 |
| 2,784,392 | Chaimowicz | Mar. 5, 1957 |
| 2,811,101 | Devol | Oct. 29, 1957 |
| 2,846,946 | Schwartzberger | Aug. 12, 1958 |
| 2,871,432 | Marzetta | Jan. 27, 1959 |
| 2,988,217 | Mayle | Jan. 13, 1961 |

FOREIGN PATENTS

| | | |
|---|---|---|
| 786,024 | Great Britain | Nov. 13, 1957 |